United States Patent [19]
Hobson

[11] Patent Number: 4,746,283
[45] Date of Patent: May 24, 1988

[54] HEAD TOOLING PARISON ADAPTER PLATES

[76] Inventor: Gerald R. Hobson, 825 First Ave. NE., Waverly, Iowa 50677

[21] Appl. No.: 32,547

[22] Filed: Apr. 1, 1987

[51] Int. Cl.$^4$ .............................................. B29C 49/04
[52] U.S. Cl. .................................. 425/528; 264/209.8; 264/540; 425/192 R; 425/381; 425/466; 425/532
[58] Field of Search ................... 425/380, 381, 192 R, 425/522, 528, 532, 457, 466, 467, 378 R; 264/540, 541, 209.1, 209.8; 249/141, 142

[56] References Cited

U.S. PATENT DOCUMENTS

| | | | |
|---|---|---|---|
| 2,632,202 | 3/1953 | Haines | 264/541 X |
| 3,078,507 | 2/1963 | Park | 264/541 |
| 3,114,932 | 12/1963 | Donnelly | 264/541 |
| 3,124,839 | 3/1964 | Adams | 264/541 X |
| 3,184,792 | 5/1965 | Commisso | 425/467 X |
| 3,211,543 | 10/1965 | Koop | 249/141 |
| 3,329,996 | 7/1967 | Marcus et al. | 425/532 |
| 3,345,690 | 10/1967 | Hagen | 425/378 R X |
| 3,398,428 | 8/1968 | Fuerst et al. | 425/378 R X |
| 4,017,250 | 4/1977 | Chang et al. | 425/457 X |
| 4,120,635 | 10/1978 | Langecker | 425/522 X |
| 4,218,416 | 8/1980 | Gokcen | 425/532 X |
| 4,470,790 | 9/1984 | Harada et al. | 425/466 X |

OTHER PUBLICATIONS

"Large-Part Engineered Blow Molding: The State of the Art", *Plastics Technology*, Mar. 1987, pp. 65-69.

*Primary Examiner*—Richard L. Chiesa
*Attorney, Agent, or Firm*—Henderson & Sturm

[57] ABSTRACT

Plastic blow molding equipment of a type including a die housing with a tubular chamber disposed therein. The die housing includes an inner portion on the inside of the tubular chamber and an outer portion on the outside of the tubular chamber. The tubular chamber has an outlet therein. Head tooling is attached to the die housing and this head tooling has a tubular passageway therethrough of an unequal diameter throughout the length thereof. The tubular passageway in the head tooling is in communication with the outlet in the die housing. An adjusting mechanism is associated with the head tooling for forming a parison outlet of different sizes. The adjusting mechanism includes an inner section inside of the tubular passageway and an outer section on the outside of the tubular passageway. The inner section includes a plurality of inner plates each having a progressively larger outer diameter from one end of the head tooling to the other end thereof, and the outer section includes a plurality of outer plates having an inner surface with a progressively larger diameter from one end of the head tooling to the other end thereof.

3 Claims, 3 Drawing Sheets

U.S. Patent    May 24, 1988    Sheet 3 of 3    4,746,283

HEAD TOOLING PARISON ADAPTER PLATES

TECHNICAL FIELD

The present invention relates generally to plastic blow molding equipment and more particularly to an improved apparatus for quickly and easily changing the opening diameter of the head tooling so as to be able to adjust the diameter of a parison formed thereby.

BACKGROUND ART

In plastic blow molding equipment, the head tooling determines the diameter of the parison formed by such equipment. It is often necessary to change the head tooling to form parisons of a different diameter when it is desired to blow mold a product larger or smaller than the last object molded by such equipment. If the parison formed is too small, the walls of the object being blow molded are likely to be too thin, at least in places.

If the parison is too large for the product being formed, plastic material is wasted and a build-up of excess material due to such excessively large parisons can cause a malfunctioning of the equipment. Consequently, the head tooling must be changed from time to time to obtain the optimum sized parison for the particular product to be formed.

This changing of the head tooling is a time-consuming job, which is expensive, not only from a labor standpoint, but most importantly because the expensive equipment is shut down during such process. Such loss of productivity results in a loss of thousands of dollars of product. Consequently, there is a need for an apparatus which can reduce the time for changing head tooling to convert the parison being formed from one diameter to another.

DISCLOSURE OF THE INVENTION

The present invention relates to plastic blow molding equipment of a type including a die housing with a tubular chamber disposed therein. The die housing includes an inner portion on the inside of the tubular chamber and an outer portion on the outside of the tubular chamber. The tubular chamber has an outlet therein. Head tooling is attached to the die housing and this head tooling has a tubular passageway therethrough of an unequal diameter throughout the length thereof. The tubular passageway in the head tooling is in communication with the outlet in the die housing. An adjusting mechanism is associated with the head tooling for forming a parison outlet of different sizes. The adjusting mechanism includes an inner section inside of the tubular passageway and an outer section on the outside of the tubular passageway. The inner section includes a plurality of inner plates each having a progressively larger outer diameter from one end of the head tooling to the other end thereof, and the outer section includes a plurality of outer plates each having an inner surface with a progressively larger diameter from one end of the head tooling to the other end thereof.

An extruding mechanism is provided for delivering a deformable material in a plastic condition to the tubular chamber and forcing such deformable material through the tubular chamber in the die housing and through the tubular passageway in the head tooling to form a parison attached to the outlet of the head tooling.

An object of the present invention is to provide an improved head tooling apparatus.

Another object is to provide an apparatus for easily and quickly adjusting the size of the outlet opening on head tooling.

Other objects, advantages, and novel features of the present invention will become apparent from the following detailed description of the invention when considered in conjunction with the accompanying drawings.

BEST MODES FOR CARRYING OUT THE INVENTION

Figure 1:
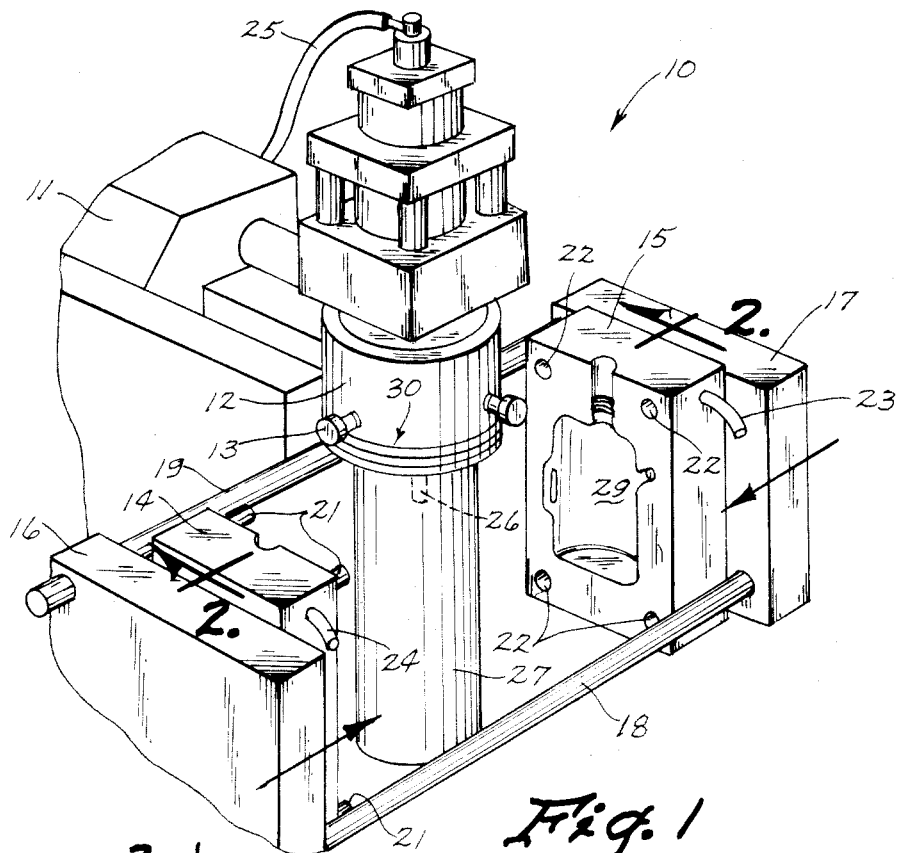
FIG. 1 shows a perspective view of a preferred embodiment of the present invention shown attached to blow molding equipment including a mold for a bottle.

Referring now to the drawings wherein like reference numerals designate identical or corresponding parts throughout the several views, FIG. 1 shows blow molding equipment (10). The blow molding equipment (10) includes an extruder (11) for heating up plastic material to be used in forming containers or the like and delivering it to a die head (12) having a screw parison adjustment (13) thereon.

Mold halves (14) and (15) are attached to platens (16) and (17) which are connected slideably together by support rods (18) and (19). Guide pins (21) on mold half (14) extend into depressions (22) in mold half (15) for insuring that when the mold halves (14) and (15) come together they will be in a proper relative relationship.

Water lines (23) and (24) extend into the mold halves (14) and (15) for cooling down the mold and making the product hard so that it will hold its shape after it is ejected from the mold. An air line (25) is attached to the equipment for blowing air down to and through an air pin (26) which extends inside of a parison (27).

Figure 4:
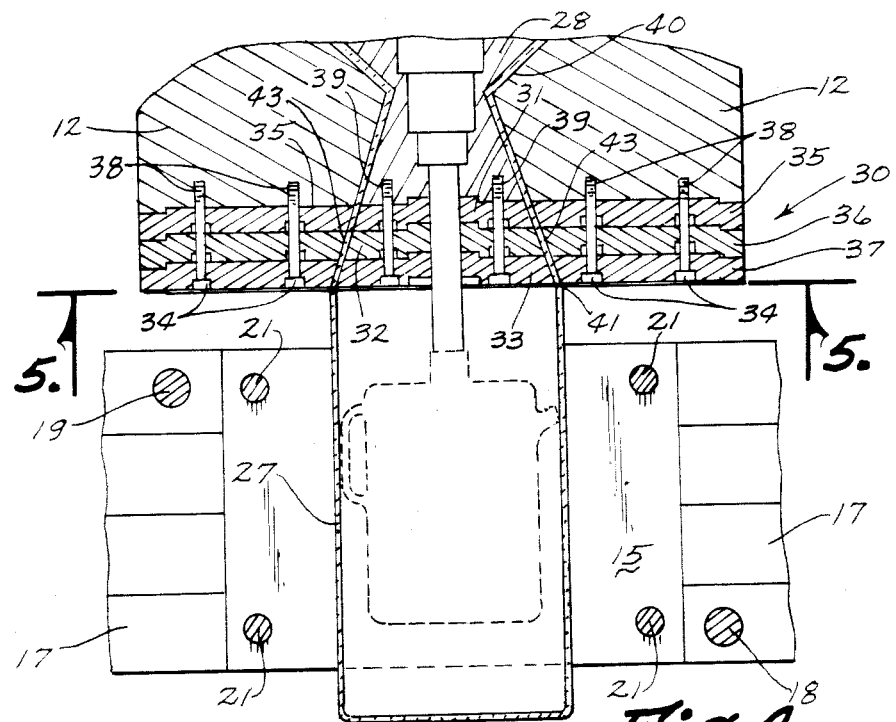
FIG. 4 is a view like FIG. 3, but showing a head tooling apparatus with a plurality of plates forming a diverging tubular passageway, the head tooling being constructed in accordance with the present invention attached to the die head for adjusting the size of the parison formed thereby to be of an appropriate size for the bottle being formed by the blow molding equipment.

Referring to FIG. 4, the present invention relates to the head tooling (30) which includes a plurality of inner plates (31), (32) and (33) and a plurality of outer plates (35), (36) and (37). Bolts (34) are threadably engaged into openings (38) in the die head (12) and into openings

(39) in an inner portion (28) of the die head (12). A plastic material can extend through the tubular chamber (40) between the outer die head (12) and the inner die head part (28) and leads to a tubular passageway formed between the plates (31), (32) and (33) and the outer plates (35), (36) and (37) to form an outlet (41) which causes the parison (27) to be of the diameter shown in FIG. 4.

Figures 5, 6:
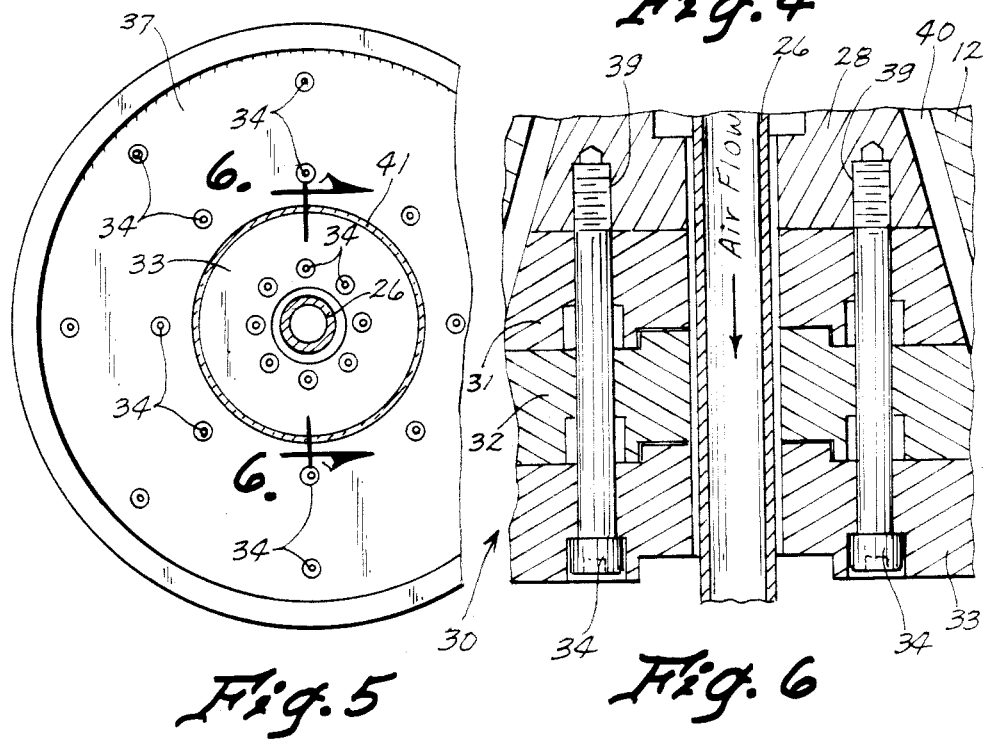
FIG. 5 is a view taken along line 5—5 of FIG. 4.
FIG. 6 is an enlarged, partial, cross-sectional view taken along line 6—6 of FIG. 5 and showing an air tube extending into the inside of the parison for selectively causing the parison to be blown outwardly to conform to the inside of the mold.

The head tooling embodiment (30) shown in FIGS. 4, 5 and 6 is generally known as a diverging type because the diameter of the cylindrical passageway (43) formed between the plates (31), (32) and (33) and the outer plates (35), (36) and (37) generally gets larger as the material flows along the passageway (43).

Figure 2:
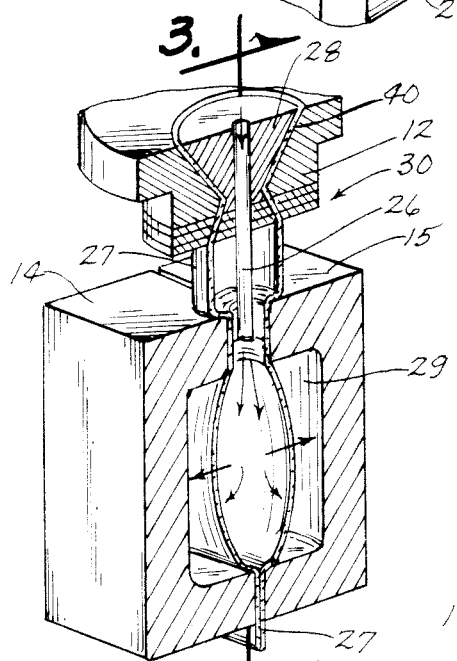
FIG. 2 is an enlarged, partial, perspective, cross-sectional view taken along line 2—2 of FIG. 1.
Figure 3:
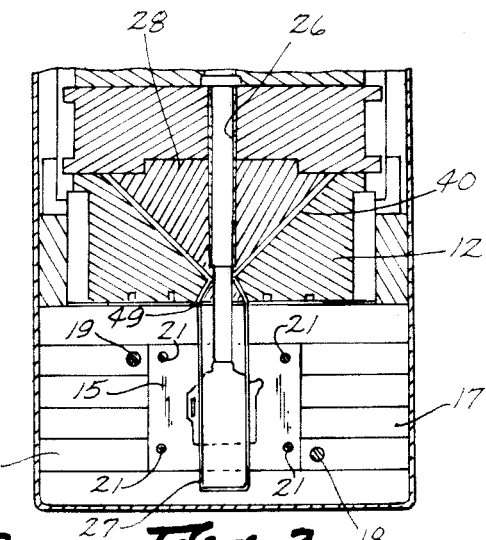
FIG. 3 is a cross-sectional view taken along line 3—3 of FIG. 2 and showing a parison being formed by the head tooling, which parison is too small for the part being formed.

In operation, the blow molding equipment (10) would have plastic in granulated form entering the extruder (11) via a hopper (not shown). The plastic material becomes a molten resin around a heated screw (not shown). This screw will push the resin into an accumulator (not shown) and a ram (not shown) will push the resin into the die head (12) through chamber (40) and passageway (43) to form a parison (27) of a size shown in FIG. 3. Since the parison formed in FIG. 3 is too small for the part being formed, the head tooling (30) would be attached thereto in an appropriate size with an appropriate number of plates in order to form the diameter of the parison (27) desired. This parison (27) will hang between the two mold halves (14) and (15), as shown in FIG. 1, which are clamped onto platens (16) and (17). When the platens (16) and (17) close together, the parison (27) will be pinched off on the top and bottom, for example, as shown in FIG. 2. The mold halves (14) and (15) have a relief area to allow for excess material. The rest of the parison (27) is encapsulated in the mold cavity (29), although sometimes this is not possible due to configuration of the part and the parison is pinched off all around the edge of the cavity (29).

In the case of a conventional top blow set-up, air is blown into the mold through the center of the die head (12) and through the head tooling (30) via a blow pin (26). Referring to FIG. 2, the parison (27) is then blown onto the cavity walls just like a balloon. The mold is then internally cooled so that the material sets up to form a final part. The diameter of the parison (27) is in direct relation to the size and shape of the mold cavity (29). The parison (27) as shown in FIG. 3 has to stretch a long way into the corners, which means that the part will get very thin at this location if the parison of this size is used. Consequently, using the prior art technology, the entire head tooling assembly would have to be changed to form a larger parison, which is a heavy and tedious job. By bolting on an appropriate number of plates, such as shown in FIG. 4, the size of the parison can easily be changed. If, for example, a smaller parison (27) is desired than that shown in FIG. 4, then the bolts (34) could be removed and plates (33) and (37) could be removed with the bolts (34), or a shortened form thereof, being reattached so that the plates (31), (32), (35) and (36) would still be held in place and the smaller parison (27) would be formed. If a still further reduction in the diameter of the parison (27) is desired, more pairs of inner and outer plates (31) or (32) and (35) and (36) could be removed. It will also be understood to those skilled in this art that more plates could be added beyond the three pairs shown in FIG. 4, in order to increase the size of the parison from that shown in FIG. 4.

Figure 7:
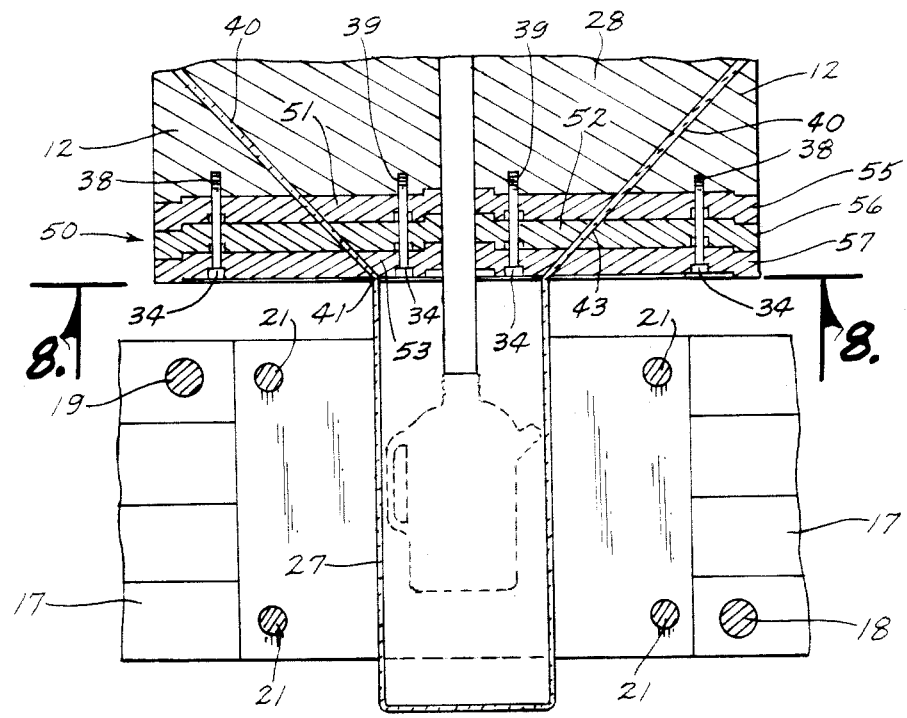
FIG. 7 is a view like FIGS. 3 and 4 except that an alternate converging form of the present invention is shown for adjusting the size of the parison being formed by the blow molding equipment.
Figure 8:
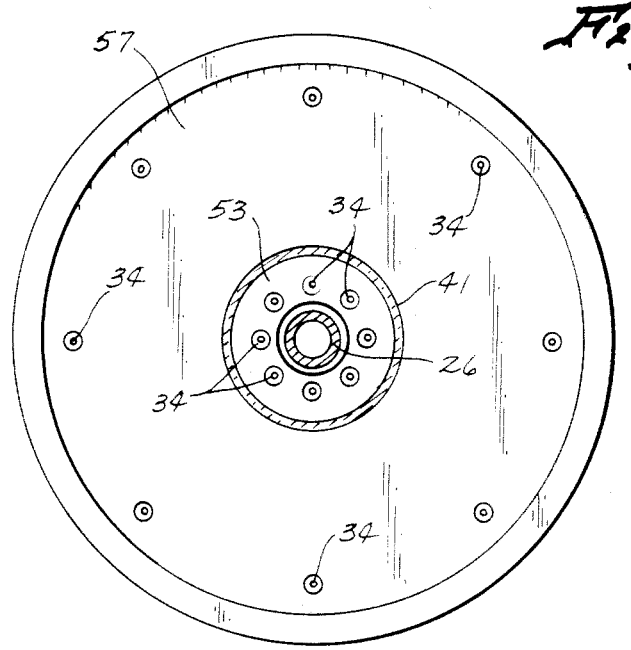
FIG. 8 is a view taken along line 8—8 of FIG. 7.

Referring now to FIG. 7, it is noted that an alternate embodiment (50) of the head tooling adjusting mechanism is shown. The head tooling adjusting mechanism is of a converging type wherein the passageway (43) gets smaller as it gets closer to the outlet opening (41), which is just opposite from the diverging head tooling apparatus (30) shown in FIG. 4. It will be readily appreciated by those skilled in this art that to make the parison (27) smaller than that shown in FIG. 7, one or more of sets of inner and outer plates can be removed. For example, if a slightly larger parison (27) is desired, plates (53) and (57) could be removed and the other plates bolted back in place. If a still larger parison diameter is desired, the inner and outer plates (52) and (56) could be removed, bolting the plates (51) and (55) back in place. If a still further increase in the parison size (27) is desired, then all of the plates, including plates (51) and (55), would be removed.

It will be understood to those skilled in this art that if it is desired to form a parison of a diameter larger than the outlet (49) shown in FIG. 3, the diverging head tooling apparatus (30) would be utilized; and, if it is desired to provide a parison having a diameter smaller than the diameter of the outlet (49) shown in FIG. 3, the converging head tooling apparatus (50) of FIG. 7 would be utilized.

Accordingly, it is believed to be clear that all of the aforementioned objects have been accomplished. Obviously, many modifications and variations of the present invention are possible in light of the above teachings. It is therefore to be understood that, within the scope of the appended claims, the invention may be practiced otherwise than as specifically described.

I claim:

1. Plastic blow molding equipment consisting of:

a die housing having a tubular chamber disposed therein, said tubular chamber having an outlet in said die housing, said die housing including an inner portion on the inside of said tubular chamber and an outer portion on the outside of said tubular chamber;

head tooling attached to said die housing, said head tooling having a tubular passageway therethrough of an unequal diameter throughout the length thereof, said tubular passageway in said head tooling being in communication with the outlet in the die housing;

adjusting means associated with said head tooling for forming a parison outlet of an adjustable size, said adjusting means including an inner section defining the lower portion of the inside of said tubular passageway and an outer section defining the lower portion of the outside of said tubular passageway, said inner section including a plurality of inner plates each having a progressively larger outer diameter from one end of head tooling to the other end thereof and said outer section including a plurality of outer plates each having an inner surface with progressively larger diameter from the said other end of the head tooling to the said one end thereof;

means for delivering a deformable material in a plastic condition to said tubular chamber and forcing such deformable material through said tubular chamber in the die housing and through the tubular passageway in the head tooling to form a parison attached to the outlet of said head tooling; and means for removing or adding one or more of said inner and outer plates for adjusting the size of the parison outlet in the head tooling.

2. The equipment of claim 1 wherein said other end is at the parison outlet end and said tubular passageway diverges outwardly from said one end to said other end.

3. The equipment of claim 1 wherein said one end is at the parison outlet end and said tubular passageway converges inwardly from the other end toward said one end.

* * * * *